April 14, 1925.
C. BYHRE
BEVEL SQUARE
Filed May 20, 1924    3 Sheets-Sheet 1
1,533,097
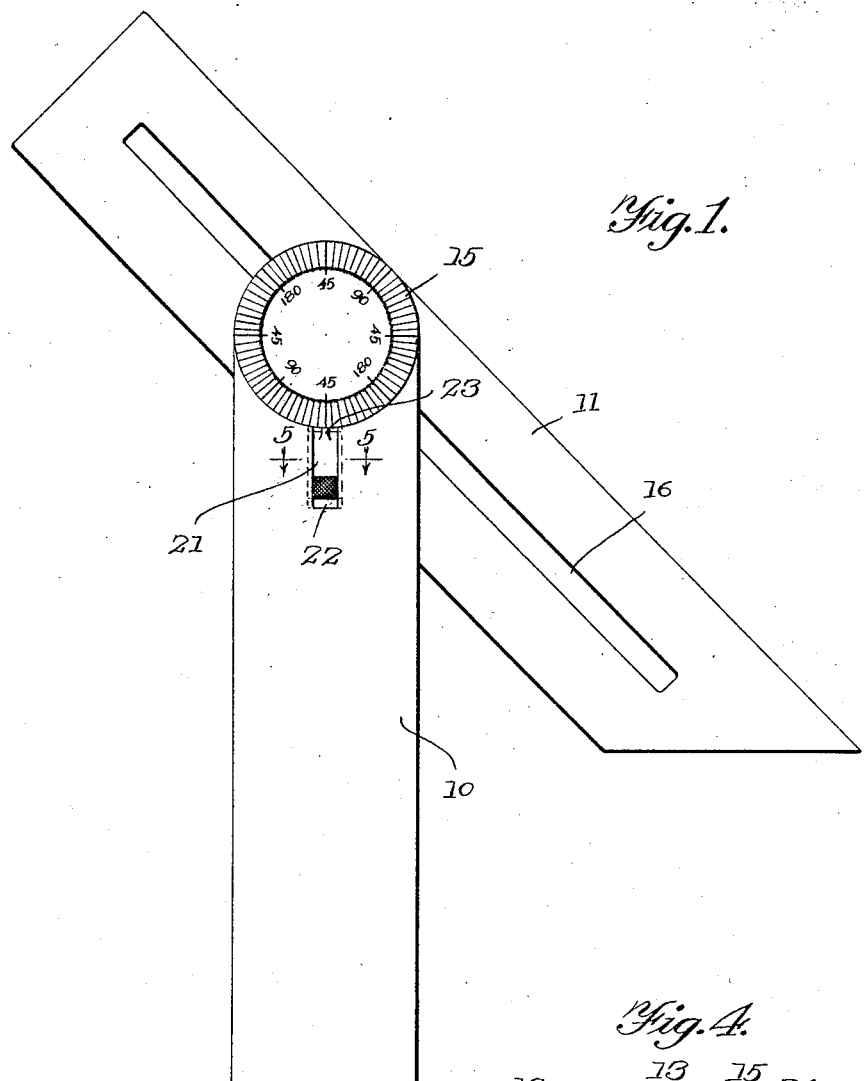
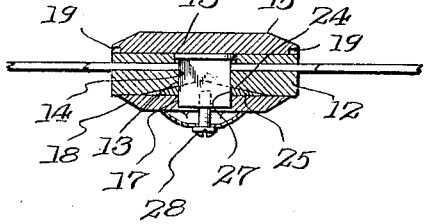

April 14, 1925.
C. BYHRE
BEVEL SQUARE
Filed May 20, 1924

Christian Byhre
INVENTOR

BY Victor J. Evans
ATTORNEY

WITNESS:

April 14, 1925.                     C. BYHRE                     1,533,097
                                   BEVEL SQUARE
                              Filed May 20, 1924           3 Sheets-Sheet 3
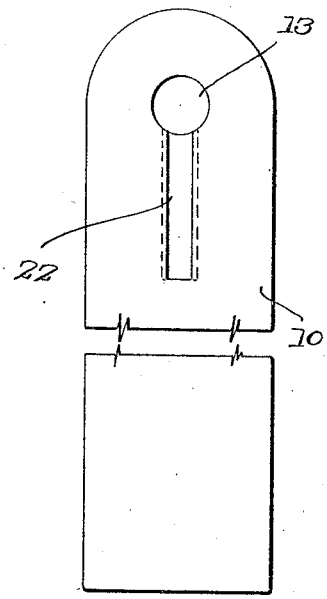
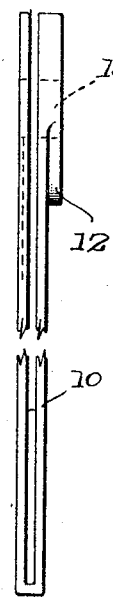
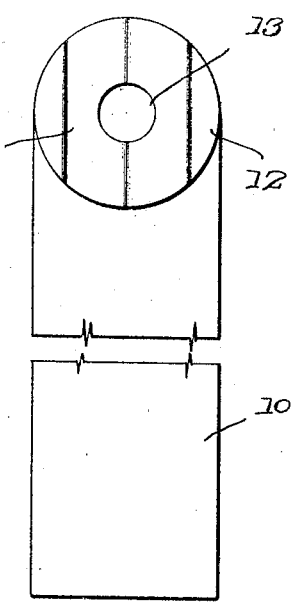
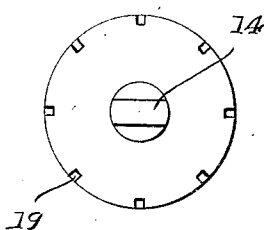
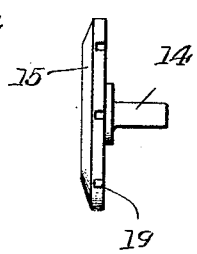
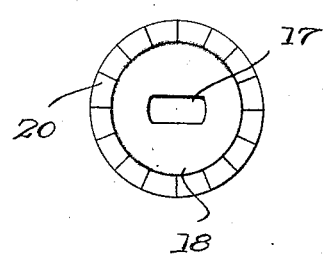
Christian Byhre
INVENTOR
BY Victor J. Evans
ATTORNEY
WITNESS Patented Apr. 14, 1925.

1,533,097

UNITED STATES PATENT OFFICE.

CHRISTIAN BYHRE, OF HALLECK, CALIFORNIA.

BEVEL SQUARE.

Application filed May 20, 1924. Serial No. 714,722.

*To all whom it may concern:*

Be it known that I, CHRISTIAN BYHRE, a citizen of the United States, residing at Halleck, in the county of San Bernardino and State of California, have invented new and useful Improvements in Bevel Squares, of which the following is a specification.

This invention relates to carpenters' tools, and has particular application to a combined square and bevel, embodying two separate and distinct locking means adapted to be singly used for locking the movable blade of the bevel square in fixed relation with the body portion thereof, whereby either of two different kinds of graduations or measurements may be used.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the tool,

Figure 4 is a sectional view taken on line 4—4 of Figure 2,

Figure 5 is a sectional view taken on line 5—5 of Figure 1,

Figure 6 is a detail view in elevation of the body portion of the tool,

Figure 7 is a view taken at a right angle from Figure 6,

Figure 8 is a view looking at the opposite side of the tool, from that shown in Figure 6, Figure 9 is a rear view of one of the graduated disks, Figure 10 is a view taken at a right angle to Figure 9, Figure 11 is a face view of the other graduated disk, Figure 12 is a detail view of the locking lever.

Figure 2:
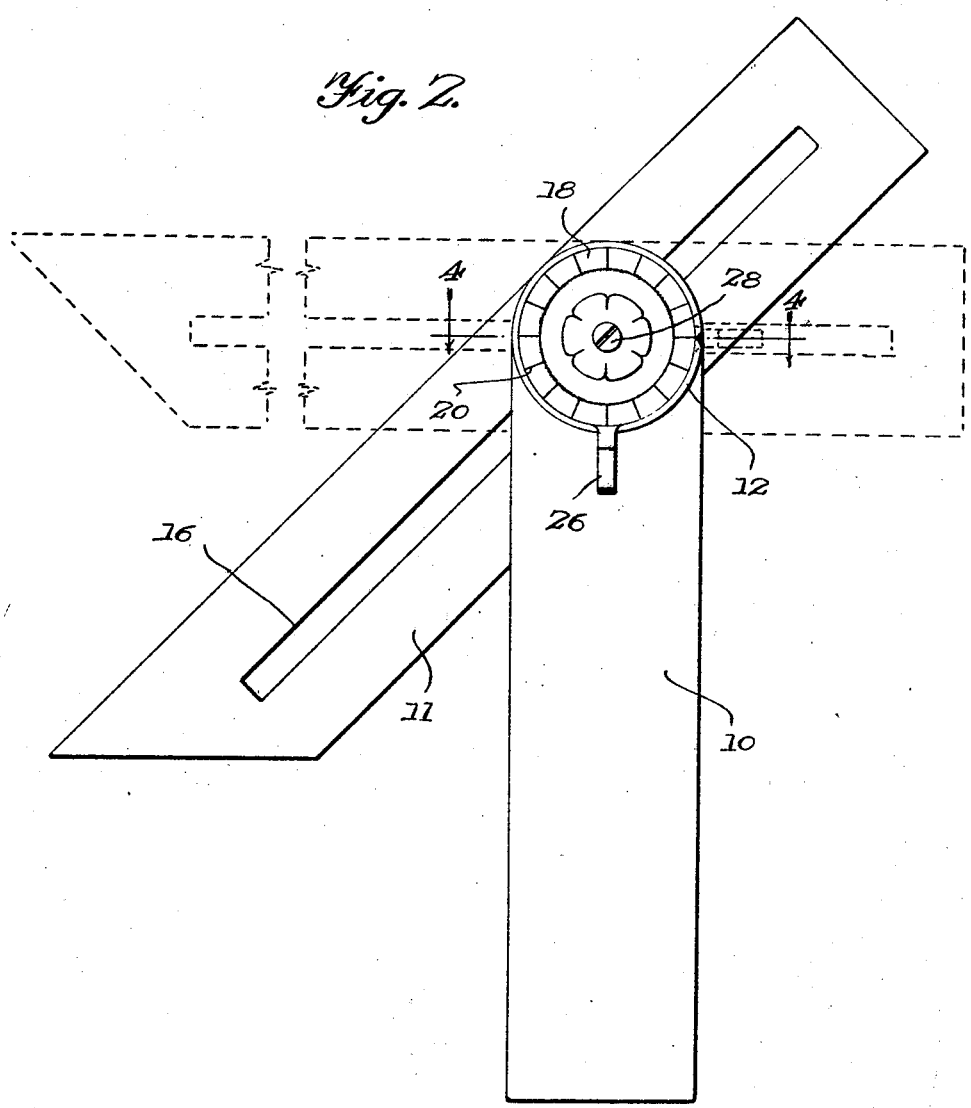
Figure 2 is a similar view looking at the opposite side of the tool.
Figure 3:
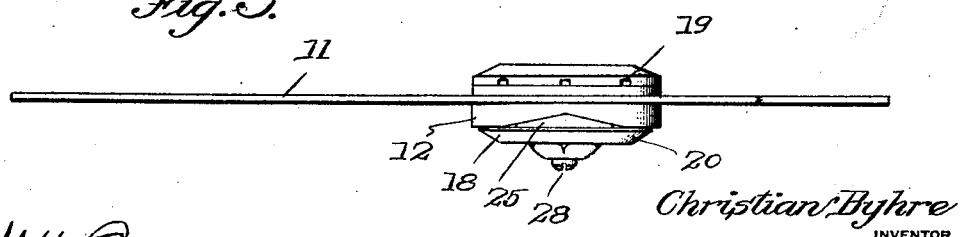
Figure 3 is a top plan view.

As herein above stated, the invention contemplates the provision of a combined square and bevel primarily intended for use by carpenters, and wherein 10 represents the body portion of the bevel square, and 11 the movable or adjustable blade. The body member 10 is as clearly illustrated in Figure 7 substantially U-shaped, while one side of this body member adjacent the open end thereof is thickened as at 12. The parallel sides of the body member are provided with aligned openings 13 to receive the pin 14 which projects centrally from the rear side of the graduated disk 15. This pin is of elongated contour in cross section and is adapted to be passed through the longitudinal slot 16 formed in the blade 11, and is also adapted to be received by the opening 17 in the other graduated disk 18. The opening 17 is of course shaped correspondingly to the cross sectional contour of the pin 14. Consequently, when the blade 11 is swung upon the body member 10, the pin 14 serves as a pivot, and by reason of its association with the graduated disks 15 and 18 respectively, both of these disks turn in unison upon the body member 10. The disk 15 is graduated as shown, that is in 45, 90 and 180 degrees, while the periphery of this disk is formed with a notch 19 for each of these major graduations. The disk is of course otherwise graduated between the major graduations above referred to, while the disk 18 is provided with inch graduations indicated at 20.

The bevel square embodies two distinct locking features depending for their use upon the particular degree or angle at which the blade 11 is adapted to be arranged with respect to the body member 10. When the major graduations above referred to and arranged upon the disk 15 are used, the locking slide 21 is employed to hold the blade 11 fixed in its given position. This slide 21 operates in a longitudinal slot 22 formed in one of the parallel sides of the body member 10 and clearly illustrated in Figure 6. The slide is formed with a projection 23 adapted to be received by the particular notch 19 which is brought into alignment with the slot 22. If on the other hand, any of the minor graduations arranged on the disk 15 are to be used, or the inch graduations on the disk 18 are to be used, then the locking lever shown in Figure 12 is employed to hold the blade 11 fixed with relation to the body member 10.

This locking lever is of substantially V-shaped formation in cross section and is positioned between the thickened portion 12 of the body member 10 and the graduated disk 18. This thickened portion 12 of the body member is formed with a recess 24 which is shaped to normally accommodate the lever 25. The lever is formed with an extension 26 so that it can be conveniently manipulated, and is further provided with an enlarged round opening 27 for the reception of the pin 14, a construction which allows the lever 25 to be turned upon the pin 14 without transmitting motion to the latter or to either of the graduated disks. Threaded into one end of the pin 14 is a headed element 28 which supports a washer 29. This washer 29 is of substantially saucer shape, and split about its edges, so that the washer can be used in the dual capacity of a washer and spring. It will be noted that the washer is supported on the threaded element 28 with the edge of the washer bearing against the graduated disk 18, and is used in a manner to be presently set forth. When the lever 25 is positioned within the recess 24, the washer 29 is not placed under much tension, just sufficient to hold the lever in its normal position, but when the lever is swung to a position to cross or traverse the recess 24, the apex of said lever bears against the widest part of the thickened portion 12 of the body member, thus forcing the graduated disk 18 outwardly and flexing the washer 29 which is then tensioned to frictionally maintain the blade 11 in an adjusted position. By reason of this construction use may be made of any of the minor graduations either on the disk 15 or disk 18, and when the lever 25 is employed to hold the blade fixed with relation to the body member 10, use of the locking slide 21 is dispensed with. The tool in its entirety is very simple in construction and can be quickly and conveniently manipulated for the purpose for which it is intended.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A combined square and bevel including a body portion of U-shaped formation, and a movable blade arranged between the parallel sides of the body portion and having a longitudinal slot, a graduated disk arranged on one side of the body portion, a pin projecting therefrom and passed through said body portion and the slot of the blade, said pin being elongated in cross section, a second graduated disk arranged at the opposite side of the body portion and supported by said pin, whereby both of said disks and blade are moved pivotally as a unit, means carried by the body portion and co-operating with the first mentioned disk for holding the blade fixed with relation to the body portion in predetermined positions, said body portion being thickened adjacent one end and having a substantially V-shaped recess, a lever pivoted on said pin and interposed between the thickened portion of the body member and the second mentioned disk, said lever being V-shaped in cross section and normally arranged in said recess, resilient means for normally holding the lever in said recess and functioning to hold the blade fixed with the body portion in different positions between said predetermined positions, when said lever is removed from the recess and arranged to traverse the latter.

In testimony whereof I affix my signature.

CHRISTIAN BYHRE.